G. E. CASSEL.
TRACTION WHEEL.
APPLICATION FILED JULY 16, 1914.
1,263,643.
Patented Apr. 23, 1918.
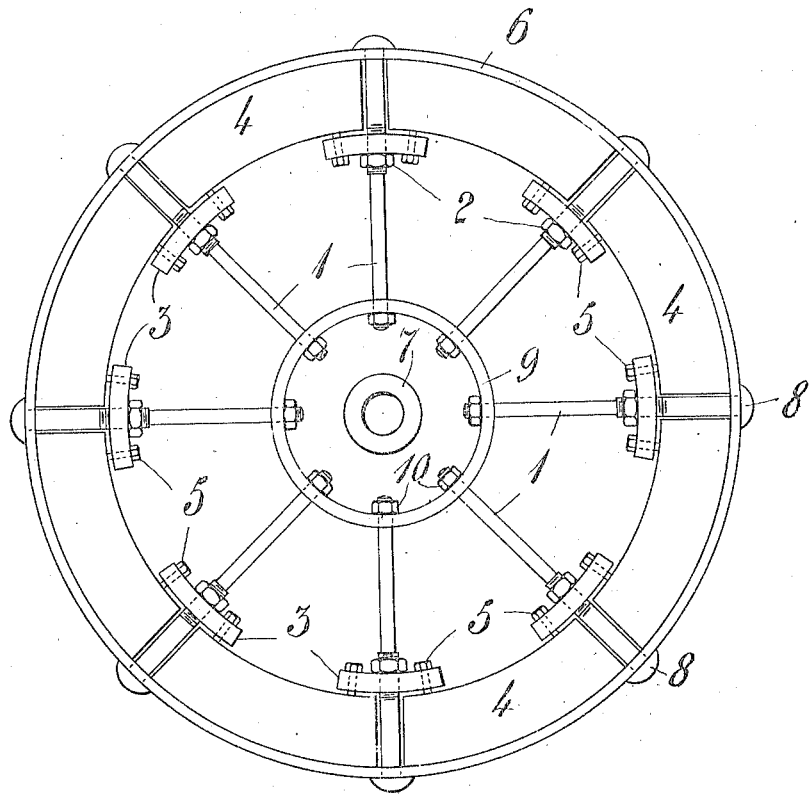

UNITED STATES PATENT OFFICE.

GUNNAR ELIAS CASSEL, OF WATTHOLMA, SWEDEN

TRACTION-WHEEL.

1,263,643.　　Specification of Letters Patent.　　Patented Apr. 23, 1918.

Application filed July 16, 1914.　Serial No. 851,324.

*To all whom it may concern:*

Be it known that I, GUNNAR ELIAS CASSEL, a citizen of the Kingdom of Sweden, residing at Wattholma, Sweden, have invented new and useful Improvements in Traction-Wheels, of which the following is a specification.

This invention relates to traction vehicles for agricultural purposes and more particularly to the driving wheels of traction vehicles adapted, instead of beasts of burden, to draw other vehicles or agricultural implements. In traction vehicles of that kind it is of importance that the vehicle possesses so great an adhesion weight that, even on unfavorable ground, it may be capable of displaying a considerable traction force without the risk of slipping. On the other hand, it may in many cases be desirable that the traction engine be not too heavy, as for instance if it has to draw implements intended for light agricultural work, as harrows or the like, since otherwise the traction engine will flatten down the ground too much.

The invention has for its object to provide for both of the wants mentioned above and consists chiefly in the provision in the driving wheels of the traction vehicle of means for attaching to said wheels, when a particularly great adhesion weight is desired, a number of weights preferably segment-shaped. By arranging the weights in this manner the whole weight thereof will be utilized for increasing the adhesion weight and further any increase of the journal pressure is obviated. Finally, an essential advantage is obtained in that the considerably increased moment of inertia of the wheels decreases the risk of slipping to a great extent. Such slipping will arise if one or both of the traction wheels during slow motion of the traction engine get an opportunity of slipping so that the ground becomes smoothed on a certain spot, before the vehicle has been able to proceed sufficiently for reaching good ground. By increasing the moment of inertia of the wheels so that it corresponds to a substantial part of the mass of the whole traction engine, the wheels will not be accelerated to any essential degree and will not, on account thereof, be capable of smoothing the ground before the vehicle has passed the risky point.

These and other objects may be attained by means of the construction illustrated in the accompanying drawing showing a side elevation of a traction wheel constructed according to the invention.

Referring to the drawing, 1 denotes the spokes, 6 the rim and 7 the nave of the wheel. The spokes 1 pass through openings in the rim 6 and are at the outer end provided with heads 8 bearing against the outer side of the rim 6. The inner ends of the spokes 1 are by means of nuts 10 secured to a flange 9 attached to or integral with the nave 7. Removably placed on the inner side of the rim 6 is a number of weights 4 preferably having the form of circular segments. The said weights are kept in position on the rim 6 by means of clamping members 3 slidably placed on the spokes 1. The clamping members 3 are forced in the direction of the weights 4 by means of nuts 2 screwed onto threaded portions 11 of the spokes 1 and bearing against the clamping members 3. In order to facilitate the clamping action of the members 3 they are provided with set screws 5 passing through said members and the ends of which bear against the weights 4. By means of said set screws one may be able to adjust the position of the clamping members more accurately according to the uneven surfaces of the weights 4. It will be readily understood that by means of the clamping device described above the weights may be placed on the rim 6 in lateral direction and then clamped effectively to the rim by the aid of said clamping device.

Having now particularly described my invention, what I claim as new and desire to secure by Letters Patent is:

1. A traction wheel comprising a plurality of compact weights evenly distributed around the wheel and removably affixed to the wheel rim, and radially movable clamping devices to hold said weights in position on said rim, substantially as and for the purpose set forth.

2. A traction wheel comprising a plurality of compact segment shaped weights evenly distributed around the wheel and removably affixed to the wheel rim, and radially movable clamping devices to hold said weights in position on said rim, substantially as and for the purpose set forth.

3. A traction wheel comprising a number of weights removably secured to the rim of the wheel, clamping members bearing against said weights, and nuts screwed onto the spokes of the wheel and forcing the clamping members toward the weights, substantially as and for the purpose set forth.

4. A traction wheel having a plurality of headed spokes projecting through the wheel rim, segment shaped weights mounted on the rim between the spokes, clamping members movably mounted on the spokes and projecting over the ends of the weights, nuts mounted on threaded portions of the spokes adapted to force the clamping members toward the weights, and set screws in said members bearing on said weights.

5. A traction wheel having a flange formed on the nave thereof, headed spokes projecting through the wheel rim and flange and connected to the latter by nuts on their inner ends, arc-shaped weights mounted on the rim between the spokes, clamping members movably mounted on the spokes and projecting over the ends of the weights, nuts mounted on threaded portions of the spokes adapted to force the clamping members toward the weights, and set screws in said members bearing on said weights.

In testimony that I claim the foregoing as my invention, I have signed my name in presence of two subscribing witnesses.

GUNNAR ELIAS CASSEL.

Witnesses:
JOHN DELMAR,
K. E. WIBERG.